United States Patent [19]
Janu

[11] 3,777,778
[45] Dec. 11, 1973

[54] TWO-POSITION LIQUID LEVEL CONTROLLER

[75] Inventor: George J. Janu, Milwaukee, Wis.

[73] Assignee: Johnson Service Company, Milwaukee, Wis.

[22] Filed: Aug. 30, 1972

[21] Appl. No.: 284,775

[52] U.S. Cl.................................. 137/487.5, 4/10
[51] Int. Cl............................................ F16k 31/36
[58] Field of Search ................. 4/10; 137/236, 357, 137/487.5

[56] References Cited
UNITED STATES PATENTS

| 482,439 | 9/1892 | Liernur | 137/236 |
| 3,181,553 | 5/1965 | Liljendahl | 137/357 |
| 3,239,849 | 3/1966 | Liljendahl | 4/10 X |
| 3,548,865 | 12/1970 | Povinger | 137/487.5 X |

FOREIGN PATENTS OR APPLICATIONS
390,117  3/1933  Great Britain............................ 4/10

Primary Examiner—Henry T. Klinksiek
Attorney—Andrus, Sceales, Starke & Sawall

[57] ABSTRACT

A two-position liquid level controller includes a static pressure sensor establishing a control signal at selected first level in a temporary storage means such as the standpipe of a vacuum operated sewage system. The sensor is connected upstream of a discharge control means and actuates a timer at the selected sensed pressure. The timer is connected to actuate the discharge control means and establish flow for a predetermined period in accordance with the setting of the timer to thereby establish a second pressure level. The timer may include an input delay to prevent actuation by momentary pressure conditions.

17 Claims, 1 Drawing Figure

PATENTED DEC 11 1973  3,777,778
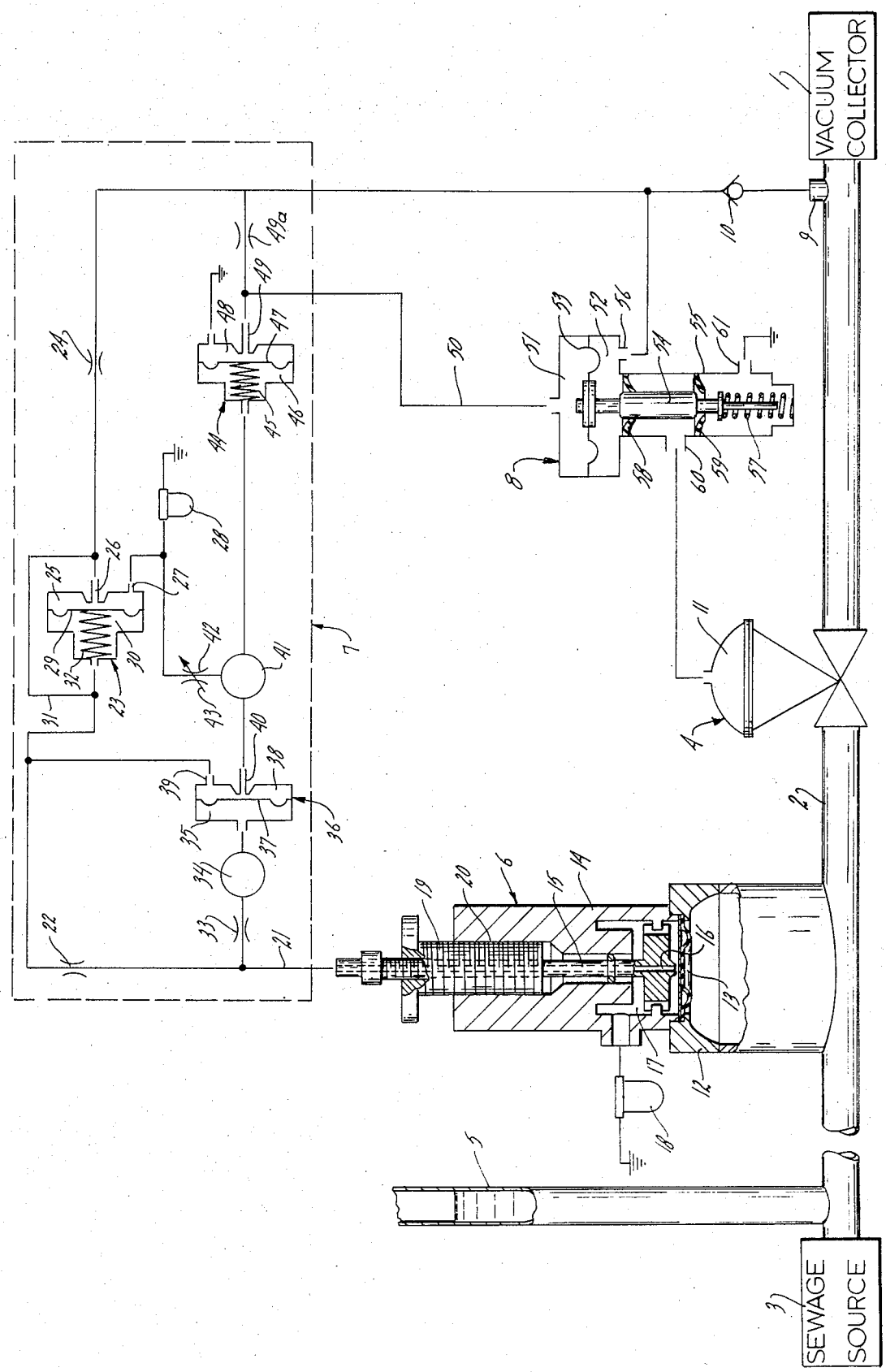

TWO-POSITION LIQUID LEVEL CONTROLLER

BACKGROUND OF THE INVENTION

This invention relates to a two-position liquid level controller and particularly to a liquid level controller which controls a liquid level in a temporary storage means between selected upper and lower limits.

In various flow systems, a temporary storage means such as a storage tank, a stand pipe or the like within which liquid is stored until it reaches a selected level may be incorporated into the system. When such a selected level is reached a discharge apparatus is actuated to remove liquid generally until a lower limit is established. A conventional, two-position liquid level controller may sense the static pressure in the flow system downstream of the temporary storage medium or means and respond to the increasing pressure associated with the increasing liquid level to initiate discharge. When the sensed pressure of the liquid reaches a low limit, which may be adjusted independently or in terms of the hysteresis of the switching system, the discharge is terminated. Many liquid level controllers and flow systems conveniently employ a main discharge valve which is opened when the liquid level reaches a predetermined upper limit and closes when the liquid level reaches an adjusted lower limit.

Although such systems have been widely employed, special consideration and care must be taken in certain flow systems where the low limit static pressure is difficult to sense because of dynamic effects of flow. Where variable flow source is employed in combinsation with a static pressure sensor to determine the upper and lower limits, the volume of liquid dispensed may vary from one of the dispensing cycles to another. Further, the controlled sensor at least should be placed adjacent to the storage means in order to increase the accuracy of sensing of the low limit pressure.

SUMMARY OF THE PRESENT INVENTION

The present invention is directed to a two-position liquid level controller to establish and control discharge flow in response to a high limit of hydrostatic pressure for a predetermined period of time. Generally, in accordance with the present invention, the controller includes a sensor responsive to the pressure as the liquid level reaches a predetermined maximum level. The sensor actuates a timing means to establish discharge flow for a predetermined time after which the system resets to standby to subsequently respond when the liquid level again establishes a signal indicating a high limit. The timing means provides a constant volume of the liquid discharged per cycle independent of the input flow into the system. This particularly is significant when the invention is applied to flow systems which rely on a slug or incremental liquid transfer in response to a given condition; for example, a vacuum powered sewage transport system and the like. The system of this invention can be supplied by either positive or vacuum pressure.

The time delay circuit is preferably a pressure activated timer connected to the flow system as a pressure source and which is operable to accurately maintain a timing period over a considerable change in the supply or input pressure. The system preferably employs snap action sensor and response means in the timer to maintain accurate responses with slowly increasing liquid levels in the temporary storage means.

The present invention voids the disadvantages associated with the sensing of the lower limit and in particular the difficulties in measuring the static pressures with dynamic flow conditions. As only the higher limit of the hydrostatic pressure is significant in the controller, the controller package and the system can be mounted immediately upstream and very close to the main discharge control to further minimize the cost of the installation.

As applied to a vacuum operated sewage collection system, for example, a stand pipe is provided upstream of a main discharge valve. A vacuum collector is connected to and establishes a vacuum at the flow line end for the transportation of the sewage. In accordance with one aspect of the present invention, this same vacuum supplies the controller which includes a fluid sensor mounted immediately upstream of the discharge control valve and having a supply connected to the flow line downstream of the main discharge valve through a regulator as reference vacuum independent of the flow line vacuum, at least to a minimum vacuum condition. A fluid timing network connects the sensor to one side of a comparator, the opposite side of which is connected to the output of the regulator. A time delay is thus introduced to prevent response to temporary pressure changes such as shock conditions. The comparator drives a fluid timing capacitor which interconnects the output of the comparator through a suitable fluid switch to a pilot valve for controlling the main discharge valve. The pilot valve, in accordance with a further novel aspect of this invention, is constructed to produce a break-before-make switching operation to establish a reliable transfer of an operating pressure signal to the main discharge valve for actuating thereof for discharge.

The main timing capacitor is preferably a storage device connected to atmosphereic pressure through an adjustable resistor. When the output signal from the sensor is received, the vacuum connection to the capacitor is momentarily made and the vacuum established as a reference. The storage device then slowly discharges to atmosphere. This then generates a negative pressure signal to the fluid switch which actuates the pilot valve to open the main valve and thereby effect the flow. The flow continues until such time as the main capacitor has totally discharged at which time the switch converts to an "off" condition resetting the pilot valve and the main valve to a closed condition. It thus provides a flow for predetermined time periods in response to each rise of the sensed hydrostatic pressure to a selected level.

The present invention has been found to provide a relatively inexpensive and a reliable limit pressure control unit for successive discharge of liquid or other flowing material and it is particularly adapted to slug type deliveries. The system can operate either with positive or negative pressure systems and the controller may be readily connected into the main discharge system, adjacent the downstream end, and operates at system pressure.

BRIEF DESCRIPTION OF THE DRAWING

The Drawing furnished herewith illustrates a preferred construction of the present invention in which the above advantages and features are clearly disclosed as well as others which will be readily understood from the discription of such illustrated embodiment.

The Drawing is a schematic circuit illustrating a vacuum operated sewage flow system incorporating a pressure sensor and controller apparatus constructed in accordance with the present invention.

DESCRIPTION OF ILLUSTRATED EMBODIMENT

Referring to the drawing, the present invention is shown applied to a sewage flow system including a vacuum collector 1 provided at the collection or discharge end of a flow line and coupled through the flow line 2 to the sewage source 3. A main discharge valve 4 is provided in the discharge end portion of the flow line 2 and is periodically actuated to periodically provide for transfer of a predetermined amount of sewage to the collector. The flow system includes a standpipe 5 which is connected to the upstream end of the flow line 2 and within which the sewage will accumulate. As the sewage accumulates, the hydrostatic pressure in the flow line 2 increases accordingly. This hydrostatic pressure is employed to actuate a controller constructed in accordance with the present invention. In particular, the controller includes a hydrostatic pressure sensor 6 connected to the flow line 2 to respond to the hydrostatic pressure in the line. At a selected pressure level, the sensor 6 establishes an output to a pneumatic actuated timing network or device 7 which, in turn, is connected to actuate a pilot valve 8. The main valve 4 is selectively opened and closed by the operation of pilot valve 8 connecting pressure to operating chamber 11. The valves 4 and 8 as well as the sensor 6 and the timer 7 are pneumatic pressure responsive devices which are connected directly into the vacuum system via a connection tap 9 and a check valve 10 such that the controller system is driven from the main pressure means as a common power source.

More particularly, in the illustrated embodiment of the invention, the sensor 6 is shown as a diaphragm on-off unit which is especially constructed in accordance with the teaching of the copending application of Applicant, entitled "DIAPHRAGM PRESSURE SENSOR," Ser. No. 284,725, which was filed on the same day as the present application and is assigned to a common assignee with this application. Generally, the sensor includes an inlet chamber 12 coupled to the line 2 to impress flow line pressure upon a diaphragm unit 13 which is clamped against an upper housing 14. A screw nozzle 15 extends through the housing 14 and terminates in an orifice 16 in alignment with the central portion of the diaphragm 13 within an exhaust chamber 17 which is coupled to atmosphere through a suitable filter 18. The orifice 16 is connected to the exhaust in accordance with the spacing of the diaphragm 13 to provide a leakport type operation. As more fully developed in the previously referred to application, the screw 15 is threadedly mounted within an adjusting nut 19, with the screw 15 prevented from rotating but axially movable. The nut 19, in turn, is threaded into the housing 14 as at 20. The inner and outer threading has a slightly different pitch such that rotation of the nut 19 results in a corresponding adjustment of the spacing of orifice 16 with respect to the diaphragm 13 in its free position and thereby adjusts the set point pressure of the sensor 6.

The outer end of the screw passage 15 is connected to a back pressure signal line 21 which is connected to the flow line connection 9 via pressure dropping restrictor 22, a vacuum regulator 23 and a further restrictor 24, in series to the system pressure supply.

The vacuum regulator 23 is preferably a diaphragm unit constructed in accordance with the teaching of U.S. Pat. No. 3,662,779. Generally, the vacuum regulator 23 includes a control chamber 25 having a nozzle 26 connected to the restrictor 24 and supplied with pressure from tap 9. An exhaust tap 27 connects the chamber 25 via a filter 28 to a reference such as atmosphere. A diaphragm 29 closes the chamber 25 in overlying relationship to the nozzle 26 and is biased toward the nozzle by means of an adjustable compression spring 32. A control chamber 30 is connected via a common line 31 to the output of the restrictor 24 in common with nozzle 26. Thus, the vacuum at common line 31 will vary with variation of the supply line vacuum supplied by the restrictor 24. This, in turn, will vary the position of the diaphragm 29 and thus the exhaust flow via the nozzle 26. This constitutes a continuously variable restrictor connected in series with the restrictor 24 to ground, such that a closely regulated vacuum is established at the line 31 in accordance with the setting of spring 32. This vacuum is supplied to orifice 16 through the orifice 22 with the output at line 21 either at that level or at atmosphere depending upon the position of the diaphragm 13. As noted in the Applicant's copending application, the sensor 6 may be constructed with a high gain and thereby creates an on-off signal with a slight change in input.

The timing network 7 includes an input time delay means which includes a restrictor 33, in series with a capacitor 34 connected between the line 21 and an input chamber 35 of a comparator 36, and provides for establishing of a full vacuum in chamber 35, equal to that in line 21, after a predetermined time depending upon the size of the restrictor 33 and the capacitor 34. The comparator 36 is a diaphragm unit including a convoluted diaphragm unit 37 defining the signal chamber 35 and a reference chamber 38 which is connected via tap 39 to the regulated pressure supply line from regulator 23. A control nozzle 40 terminating within the chamber 38 is selectively closed and opened by diaphragm 37. The output signal from sensor 6, which is either atmosphere or regulated vacuum is transmitted via the time delay networks (33 and 34) to position the diaphragm 37. With sensor 6 fully open, atmospheric pressure is impressed on diaphragm 37 to close nozzle 40 and isolate the vacuum from the elements connected to nozzle 40. The orifice 40 is opened at a selected hydrostatic pressure level in pipe 5 as a result of cutoff of the sensor orifice 16 thereby establishing a free connection of the vacuum source to the nozzle 40. This initiates function of other components of the circuit resulting in opening of the main discharge valve and in flow from the pipe 2, as presently described, which reduces the hydrostatic pressure, opens sensor 6 to again apply atmospheric pressure to comparator 36 and cut off the vacuum connection.

The output of the comparator appearing at nozzle 40 is connected as a reset input to a timing capacitor 41. A second input is also supplied to capacitor 41 via a bleed restrictor 42 which connects the capacitor to ground via the filter 28. The restrictor 42 is preferably made adjustable as shown by the arrow 43 to permit adjustment of the delay time of the capacitor 41.

Thus, when the comparator 36 is cut off, by closure of nozzle 40 the vacuum input is removed from the capacitor 41 and it slowly bleeds to atmospheric pressure, while the vacuum within the capacitor 41 is transmitted to actuate a diaphragm switch 44.

The opening of the diaphragm comparator leakport or nozzle 40 is considerably larger than the opening of the variable restrictor 42 of the adjustable time delay unit such that the momentary connection via comparator 36 causes the capacitor 41 to rapidly assume full vacuum upon the momentary opening of nozzle 40.

The illustrated switch 44 is a spring loaded diaphragm unit which permits adjustment of the set point by the selective compression of preload spring 45 in an input chamber 46 connected to the output capacitor 41. A common diaphragm 47 forms one wall of chamber 46 and one wall of output chamber 48 connected to atmosphere as a reference. A nozzle 49 connects the chamber 48 to the flow line tap 9 via a restrictor 49a. Thus the position of the diaphragm 47 controls the vacuum signal established in the nozzle 49 which is transmitted by an input line 50 to the pilot valve 8. The adjusted spring force in the chamber 46 closes nozzle 49 and produces a vacuum pressure in the line 50 and an input chamber of the pilot valve 8. When the vacuum is transmitted to the input chamber 46 of the switch from the capacitor 41, it overcomes the force of the spring 45, causes the diaphragm 47 to open the nozzle 49 and the line 50 assumes the atmospheric pressure level.

The illustrated pilot valve 8 is preferably constructed in accordance with the teaching of Applicant's copending application entitled "Diaphragm Actuated Spool Valve" filed on the same day as this application and assigned to the same Assignee and is generally described herein. Generally, the illustrated pilot valve is a diaphragm operated spool unit having the reference chamber 51 and a control chamber 52 defined by a common diaphragm 53. A spool 54 is affixed to the diaphragm 53 and positioned thereby within a valve housing 55. Chamber 52 is connected via a tap 56 to the flow line vacuum. The spool 54 is spring loaded as by a spring 57 to bias the spool 54 and the interconnected diaphragm 53 upwardly through a pair of seal provided valve openings 58 and 59. An output tap 60 is provided intermediate the valve openings 58 and 59 and is connected to the control chamber 11 of the main valve 4. The valve opening 58 provides connection to the chamber 52 while the valve opening 59 provides a communication to a reference connection 61 in the lower portion of the housing 55, to selectively provide vacuum and atmospheric pressure signals in chamber 11 of valve 4. With a full flow line vacuum in both chambers 52 and 51, the compression spring 57 holds the spool 54 in its uppermost position, closing the valve opening 58 and opening the valve opening 59, thereby connecting the atmospheric pressure to the main valve 4, which stays in closed position. An atmospheric pressure signal established in the chamber 51 causes the diaphragm 53 and spool 54 to move downwardly against the force of spring 57 to close the valve opening 59 and open valve opening 58 thereby transferring vacuum pressure to chamber 11 of the main discharge valve and moves valve 4 from the closed position to full open for establishing flow. Thus, the output of the switch 44 of the timer 7 controls the pilot valve 8 which, in turn, controls the opening and closing of the main control valve 4.

In summary, the operation of the system can be briefly described as follows.

The pressure regulator 23 maintains a constant vacuum at the output or common line 31 even when the vacuum in the main pipe is changing, within the range of the vacuum source of collector 1. The output vacuum will normally be set slightly lower than the very smallest expected vacuum in the main pipe or the main flow line 2. This constant vacuum is supplied to the diaphragm comparator 36 and to the sensor 6 and particularly orifice 16. With the pressure in the stand pipe 5 and thus in the flow line 2 below a selected level, the pressure in the inlet chamber 12 of the sensor 6 is insufficient to significantly deflect the diaphragm 13; permitting relatively free flow from the orifice 16. Consequently, atmospheric pressure is essentially established to the downstream side of the restrictor 22 and applied via the restrictor 33 and capacitor 34 to the chamber 35 to hold the comparator in a first condition wherein the nozzle 40 is closed. The capacitor tank 41 is therefore connected directly to the atmosphere through the variable restrictor 42 and in a steady state, the pressure inside equal atmospheric. This, in turn, holds switch 44 with the diaphragm 47 closing nozzle 49. As a result of the closure of the leakport, there is no pressure drop or flow through the switch and the main output of the timer at line 50 reaches full supply vacuum which attears at tap 9. This introduces a vacuum in chamber 51 with a resulting upward movement of the spool valve 54 to the full line position shown. Full atmospheric pressure is thus applied by the tap 61 and output valve opening 59 by tap 60 to the chamber 11 of the main control valve and the valve is positively held closed by means of a built-in compression spring.

As the liquid in the sewage system accumulates, the liquid level in the stand pipe 5 increases with a corresponding increase in the hydrostatic pressure in the flow line 2. This results in inward deflection of the diaphragm 13 and at a selected level, the diaphragm so closely approaches the leakport orifice 16 that flow through the orifice is terminated. As a result, vacuum builds up in the output line 21 of the sensor 6 to the full regulated vacuum level. This vacuum is now impressed via the fixed time delay circuit and after a slight time delay, full vacuum pressure is applied to the chamber 35. The time delay prevents responding to hydraulic shocks and the like associated with the closure of the main discharge valve 4. However, when full vacuum appears in the chamber 35, the forces across the diaphragm 37 are balanced and the nozzle 40 is opened to transmit full regulated vacuum to main timing capacitor tank 41. The tank 41 which has been previously charged to atmospheric pressure is now rapidly discharged to the full level of the vacuum as established by the vacuum regulator 23.

Full regulated vacuum is thus rapidly applied to the chamber 46 of the switch 44, which overcomes the preload force of the spring 45. Switch 44 snaps to the open position, with the diaphragm 47 spaced from the leakport nozzle 49. This results in a relatively large or free flow through the switch 44 to atmosphere, with a corresponding significant pressure drop through the supply orifice or restrictor 49a. The output of the switch will therefore assume, as a practical matter, atmospheric pressure. The atmospheric pressure signal is transmitted by the line 50 to the chamber 51 of the pilot valve and positively moves the diaphragm 53 and the attached spool 54 downwardly against the bias of spring 51. The spool 54 closes the valve opening 59, preferably slightly before the opening of the upper valve opening 58. This then transmits unregulated vacuum pressure via the chamber 52, valve opening 58, and tap 60 to the main discharge valve chamber 11. This, in turn, opens the main discharge valve to establish flow.

The liquid level in the stand pipe 5 decreases with flow, with a corresponding reduction in the hydrostatic pressure in the flow line 2. The sensor 6 thus resets and reestablishes a relatively free flow from the nozzle 16 to atmosphere. As a result the output of the sensor 6 essentially returns to atmospheric pressure. This in turn resets the comparator 36 to close the associated nozzle 40. The tank 41 which has been charged to full vacuum is again connected only to atmosphereic pressure through the adjustable restrictor 42. After a predetermined time, depending upon the setting of the variable resistor 42, the tank 41 again charges from the full vacuum level to atmospheric pressure. During this timing period the switch 44 is held in the actuated state with the diaphragm 47 deflected to maintain the atmospheric pressure signal to the pilot valve 8. When the vacuum signal from capacitor 41 decreases so that it is balanced by the adjusted force of the compression spring 45 of the switch 44, such as when the vacuum on the input approaches the atmospheric level, the nozzle 49 will again be closed and full vacuum will build up in the input chamber 51 of the pilot valve 8. This will again result in a balancing of the forces on the spool valve diaphragm, and the spring load on valve 8 moves spool 54 upwardly to the full line shown thereby resetting the system and particularly closing the main discharge valve 4.

This, of course, is a completion of a single cycle of the controller.

The regulated vacuum supply in combination with the comparison network produces a constant time delay and thus a constant flow time which is essentially independent of the nominal supply vacuum established in the downstream branch of the flow line 2 by the vacuum collector 1. All of the timing components are supplied from a regulated pressure source such as the vacuum regulator 23 and the timing is determined by the discharging of a capacitor tank 41 to the full vacuum level on the output of the vacuum regulator 23 prior to opening of the main discharge valve 4 and by charging of the same tank 41 through a very accurately controlled resistor 42 back to atmospheric pressure level. The timing will therefore be unaffected, for all practical purposes by even a considerable degree in a variation in line pressure; for example, the decrease in the main supply vacuum after the main discharge valve 4 opens. This is true even if the decrease is below the level normally maintained by the vacuum regulator.

The duration of the cycle is equal to the sum of the fixed input time delay, the adjustable time delay introduced into the circuit by the setting of the resistor 42 and the required fixed time delay for switching of the pilot valve 8 and the main discharge valve 4. The fixed time delays are generally negligible and inconsequential when compared with the adjusted time delay of capacitor 41 in the circuit and consequently the system can be readily designed and adjusted with accurate timing introduced into the circuit through the selection of acpacitor 41 and the associated resistor.

This type of control is particularly significant for a slug type transfer in order to guarantee that for any given cross section of discharge valve and given vacuum in the downstream branch of the pipe, the volume of liquid discharged in one cycle will be the same. This in vacuum operated sewage transport systems assures proper function of the system at a given vacuum, given slope and shape of the main pipe and the like.

The present invention provides a reliable pressure level controller to establish flow in response to accumulating pressure signals and which can be applied in both positive and negative flow systems.

Various modes of carrying out the invention are contemplated as being within the scope of the following claims, particularly pointing out and distinctly claiming the subject matter which is regarded as the invention.

I claim:

1. A two-position liquid level controller for controlling flow in a flow line means in response to a selected first level in a temporary storage means connected to said flow line means to establish a second level comprising, a discharge control means having means for mounting in said flow line means and controlling the flow therethrough to establish said second level, a static pressure sensor adapted to be coupled to the flow line means upstream of said discharge control means, a timing means coupled to said sensor and responsive to a selected sensed pressure to establish a timing cycle of a predetermined period, and means connecting said timing means to said discharge control means to actuate said discharge control means and establish flow for said predetermined period.

2. The liquid level controller of claim 1 wherein said temporary storage means is spaced substantially from said discharge control means, and said pressure sensor is coupled to the flow line means adjacent said discharge control means.

3. The controller of claim 1 wherein said timing means includes an input delay means to momentarily delay initiation of a timing cycle and a fluid capacitive means connected between a pair of reference pressure means to control said predetermined period.

4. The liquid level controller of claim 1 wherein said discharge control means includes a main discharge valve means for controlling flow through said flow line and a pilot valve connected to control the discharge valve means, said sensor being located immediately upstream of said discharge valve means, and said sensor, said timing means and said discharge and pilot valve means having pressure activated reference input means connected to said flow line downstream of said discharge valve means.

5. The liquid level controller of claim 1 wherein said discharge control means includes a pressure source means for establishing flow through said flow line, a pressure regulator connected to said flow line to establish a reference pressure signal, and said sensor and said timing means having pressure activated reference input means connected to said pressure source means.

6. The liquid level controller of claim 1 having a first and a second pressure supply means and wherein said timing means includes a fluid activated comparator coupled to said sensor and a reference input connected to one of said supply means and responsive to a selected sensed pressure to initiate a timing cycle of a predetermined period, said timing means including a timing capacitor means having a first input means connected to said first supply means by said comparator and a second input means connected to said second pressure supply means in series with a flow resistor means to actuate said discharge means and establish flow for said predetermined period.

7. The controller of claim 1 wherein said timing means includes a fluid capacitive means, a first supply means, a variable resistor connecting said supply means to said capacitive means, a second supply means, and a pressure activated switch means connected to said sensor and selectively connecting said second supply means to said capacitive means, said switch means being reset upon the decrease in sensor pressure resulting from actuation of the discharge control means.

8. The controller of claim 7 wherein said pressure activated switch means is a comparator having a diaphragm defining an input chamber and a reference chamber, a leakport nozzle terminating in said reference chamber and having an orifice selectively opened and closed by the diaphragm, said orifice being sufficiently large to establish an essentially zero pressure drop with the diaphragm in the open position, said orifice being connected to said capacitive means and said reference chamber being connected to said first supply means.

9. The controller of claim 8 wherein said first supply means is the atmosphere and the second supply means is connected to said flow line downstream of said discharge control means.

10. The liquid level controller of claim 1 wherein said discharge control means includes a pressure operated main valve, a regulated pressure supply means, said sensor including a diaphragm amplifier having a sensing chamber connected to said flow line and having a reference input chamber connected to said pressure supply means for establishing an output signal at a selected line pressure level, a comparator means including a reference input means connected to said supply means and a signal input means, said timing means including a pressure time delay means connected to said diaphragm amplifier and said signal input means, a second supply means, and a second pressure time delay means connected to said comparator to rapidly establish a first output state and to said second supply means to establish a second state after said predetermined period and to actuate said main valve.

11. The controller of claim 10 wherein said first supply means includes a pressure regulator connected to said flow line and said second supply means is the atmosphere.

12. The liquid level controller of claim 10 having a pressure activated pilot valve connected to said flow line and said main valve for actuating said main valve, said pilot valve being a three-way valve having a break-before-make operation and a pressure regulator.

13. The controller of claim 10 wherein a vacuum collector is connected to the discharge end of said flow line and said first supply means is connected to the flow line downstream of the main valve.

14. The controller of claim 10 wherein said discharge control means includes a vacuum collector secured to the discharge end of the flow line and said pressure actuated main valve being immediately upstream of the collector, and unregulated supply connected between said main valve and said collector, a pressure regulator connected to said supply connection and defining said regulated pressure supply means, said second supply means being the surrounding environment.

15. The controller of claim 14 wherein said comparator is a diaphragm unit having a diaphragm defining one input chamber as the signal input means and a control chamber as the reference input means with a leakport nozzle connected to said pressure regulator and an exhaust connected to the surrounding environment, said first time delay means including a restrictor means in series with fluid storage means, said second time delay means including a second fluid storage means with input means connected to said leakport nozzle the orifice of said leakport nozzle being sufficiently large to transmit the regulated pressure without delay, a variable resistor connecting said last named input means to the surrounding environment, a diaphragm switch having a spring loaded input chamber connected to said second storage means and an output chamber connected to said unregulated supply connection means to define a pressure divider, a pilot spool valve means including a diaphragm operator coupled to a valve spool, said spool being movable to selectively, oppositely open and close a pair of valve openings to the opposite sides of an output means connected to said main valve, said diaphragm operator having a first chamber connected to said unregulated supply connection and a second opposed chamber connected to said pressure divider.

16. The liquid level controller of claim 1 wherein said flow line has a discharge end connected to a vacuum collector means for establishing flow through said flow line, said discharge control means includes a valve means, said sensor being located immediately upstream of said valve means, and said sensor and said timing means having pressure activated reference input means and being connected to said flow line downstream of said valve means.

17. The liquid level controller of claim 1 wherein said discharge control means includes a pressure operated main valve, a pressure activated pilot valve connected to said flow line and said main valve for actuating said main valve, said pilot valve being a three-way valve having a break-before-make operation, a pressure regulator, said sensor including a diaphragm amplifier having a sensing chamber connected to said flow line and having a reference input chamber connected to said pressure regulator for establishing an output signal at a selected line pressure level, said timing means including a comparator means having a reference input means connected to said pressure regulator and a signal input means, a pressure time delay means connected to said diaphragm amplifier and said signal input means, a pressure activated switch, and a time delay means connected to said comparator and to said pressure activated switch, said switch selectively connecting said flow line to said pilot valve for positioning said pilot valve in accordance with the sensed pressure in said flow line.

* * * * *

UNITED STATES PATENT OFFICE
CERTIFICATE OF CORRECTION

Patent No. 3,777,778                    Dated  December 11, 1973

Inventor(s)  GEORGE J. JANU

It is certified that error appears in the above-identified patent and that said Letters Patent are hereby corrected as shown below:

Column 2, Line 67, after "the" cancel "discription" and insert --- description ---;

Column 8, Line 59, after "pressure" cancel "source
Claim 5                  means" and insert --- regulator ---;

Column 9, Line 24, before "supply" cancel "first"
Claim 8                  and insert --- second ---;

Column 10, Line 1, before "unregulated" cancel "and"
Claim 14                 and insert --- an ---; and after
                         "supply" cancel "connected" and
                         insert --- connection ---;

Column 10, Line 10, after "nozzle" insert a comma
Claim 15                 --- , --- and cancel "connected
                         to" and after "regulator" insert
                         --- having an output connected
                         to said control chamber ---.

Signed and sealed this 6th day of August 1974.

(SEAL)
Attest:

McCOY M. GIBSON, JR.              C. MARSHALL DANN
Attesting Officer                 Commissioner of Patents

Disclaimer

3,777,778.—*George J. Janu,* Milwaukee, Wis. TWO-POSITION LIQUID LEVEL CONTROLLER. Patent dated Dec. 11, 1973. Disclaimer filed Mar. 20, 1986, by the assignee, *Johnson Service Co.*

Hereby enters this disclaimer to the remaining term of said patent.
[*Official Gazette June 17, 1986.*]